United States Patent
Vigild et al.

(10) Patent No.: US 9,038,608 B2
(45) Date of Patent: *May 26, 2015

(54) INTERNAL COMBUSTION ENGINE WITH INTAKE AIR HEATING, AND METHOD FOR OPERATING AN INTERNAL COMBUSTION ENGINE OF SAID TYPE

(75) Inventors: Christian Winge Vigild, Aldenhoven (DE); Wilbert Hemink, Landgraaf (NL); Daniel Roettger, Eynatten (BE); Andreas Kuske, Geulle (NL)

(73) Assignee: Ford Global Technologies, LLC, Dearborn, MI (US)

( * ) Notice: Subject to any disclaimer, the term of this patent is extended or adjusted under 35 U.S.C. 154(b) by 311 days.

This patent is subject to a terminal disclaimer.

(21) Appl. No.: 13/467,847

(22) Filed: May 9, 2012

(65) Prior Publication Data

US 2012/0291760 A1     Nov. 22, 2012

(30) Foreign Application Priority Data

May 16, 2011   (EP) .................................... 11166157

(51) Int. Cl.
*F02M 35/10*   (2006.01)
*F02M 31/13*   (2006.01)
(Continued)

(52) U.S. Cl.
CPC ...... *F02M 35/10262* (2013.01); *F02B 29/0418* (2013.01); *F02M 25/0727* (2013.01); *F02M 31/13* (2013.01); *F02M 35/10268* (2013.01);
(Continued)

(58) Field of Classification Search
USPC ....................... 123/556, 549, 179.21; 219/205
See application file for complete search history.

(56) References Cited

U.S. PATENT DOCUMENTS 4,685,437 A    8/1987  Tanaka et al.
6,354,256 B1 * 3/2002  Ohanian et al. .......... 123/179.21
(Continued)

FOREIGN PATENT DOCUMENTS

DE    19854077 A1    5/2000
DE    10214166 A1    10/2003
(Continued)

OTHER PUBLICATIONS

Vigild, Christian Winge et al., "Method for Heating the Combustion Air of an Internal Combustion Engine, and Internal Combustion Engine for Carrying Out a Method of Said Type," U.S. Appl. No. 13/467,846, filed May 9, 2012, 36 pages.

*Primary Examiner* — Marguerite McMahon
(74) *Attorney, Agent, or Firm* — Julia Voutyras; Alleman Hall McCoy Russell & Tuttle LLP

(57) ABSTRACT

Embodiments for an engine system are provided. One example internal combustion engine having at least one cylinder head and at least two cylinders, in which each cylinder has at least one inlet opening for the supply of combustion air into the cylinder, comprises an intake line leading to each inlet opening, an overall intake line where the intake lines of at least two cylinders merge, such that a distributor junction point is formed, and a heating device arranged in the overall intake line which has at least one strip-like heating element, a first narrow side of a cross section of which faces toward intake combustion air flow, wherein the heating device is arranged adjacent to the distributor junction point at which the intake lines merge to form the overall intake line, a spacing between the heating device and the distributor junction point being smaller than the diameter of a cylinder.

15 Claims, 4 Drawing Sheets

(51) Int. Cl.
*F02M 35/112* (2006.01)
*F02B 29/04* (2006.01)
*F02M 25/07* (2006.01)

(52) U.S. Cl.
CPC ....... *F02M 35/10281* (2013.01); *F02M 35/112* (2013.01); *Y02T 10/146* (2013.01); *Y02T 10/126* (2013.01)

(56) References Cited

U.S. PATENT DOCUMENTS

| | | | |
|---|---|---|---|
| 7,064,293 B2* | 6/2006 | Geiger et al. | 219/205 |
| 7,278,409 B2* | 10/2007 | Carretero | 123/556 |
| 7,464,699 B2 | 12/2008 | Joppig et al. | |
| 8,707,923 B2* | 4/2014 | Vigild et al. | 123/179.21 |
| 2006/0150958 A1 | 7/2006 | Gill et al. | |
| 2007/0039596 A1* | 2/2007 | Navalon Carretero | 123/556 |
| 2007/0125081 A1* | 6/2007 | Czarnowski et al. | 60/599 |
| 2007/0175215 A1* | 8/2007 | Rowells | 60/605.2 |
| 2007/0197157 A1* | 8/2007 | Bellinger | 454/155 |
| 2008/0047944 A1 | 2/2008 | Mueller | |
| 2009/0050117 A1* | 2/2009 | Tai et al. | 123/542 |
| 2011/0138774 A1* | 6/2011 | Pursifull et al. | 60/273 |

FOREIGN PATENT DOCUMENTS

| | | |
|---|---|---|
| DE | 102006030464 A1 | 1/2008 |
| EP | 0793399 B1 | 5/2003 |
| FR | 2876419 A1 | 4/2006 |
| JP | 61055356 A | 3/1986 |
| JP | 5039757 A | 2/1993 |

* cited by examiner

INTERNAL COMBUSTION ENGINE WITH INTAKE AIR HEATING, AND METHOD FOR OPERATING AN INTERNAL COMBUSTION ENGINE OF SAID TYPE

RELATED APPLICATIONS

The present application claims priority to European Patent Application Number 11166157.5, filed on May 16, 2011, the entire contents of which are hereby incorporated by reference for all purposes.

FIELD

The disclosure relates to an internal combustion engine.

BACKGROUND AND SUMMARY

Within the context of the present disclosure, the expression "internal combustion engine" encompasses in particular spark-ignition engines, but also diesel engines and also hybrid internal combustion engines.

Internal combustion engines have a cylinder block and at least one cylinder head which are connected to one another to form the cylinders. To control the charge exchange, an internal combustion engine requires control elements—generally in the form of valves—and actuating devices for actuating said control elements. The valve actuating mechanism required for the movement of the valves, including the valves themselves, is referred to as the valve drive. The cylinder head often serves to accommodate the valve drive.

During the charge exchange, the combustion gases are discharged via the outlet openings of the cylinders, and the charging of the combustion chambers, that is to say the induction of the combustion air, takes place via the inlet openings. If the internal combustion engine is equipped with an exhaust-gas recirculation system, the combustion air may also contain exhaust gas in addition to the fresh air sucked in from the environment. If the fuel is not injected directly into the cylinders but rather is introduced for example into the intake tract upstream of the cylinders, not only the combustion air but rather also the fuel is supplied to the cylinders via inlet openings.

It is the object of the valve drive to open and close the inlet and outlet openings at the correct times, with a fast opening of the largest possible flow cross sections being sought in order to keep the throttling losses in the inflowing and outflowing gas flows low and in order to ensure the best possible charging of the combustion chamber with fresh mixture, and an effective, that is to say complete, discharge of the exhaust gases.

According to the previous systems, the intake lines which lead to the inlet openings are at least partially integrated in the cylinder head and are generally merged, often to form a single overall intake line, such that at least one so-called inlet manifold is formed.

Various demands are placed on the inlet region of an internal combustion engine. It is sought inter alia to provide an arrangement and design of the intake lines which leads to as small as possible a pressure loss in the intake combustion air in order to ensure good charging of the cylinders with fresh mixture.

The geometry of an intake line furthermore has an influence of the charge movement in the cylinder and therefore on the mixture formation, in particular in direct-injection internal combustion engines. The intake lines are therefore often designed so as to generate a so-called tumble or a spinning flow which accelerate and assist the mixture formation, wherein a tumble is an air swirl about an imaginary axis which runs parallel to the longitudinal axis of the crankshaft, and a spin is an air swirl whose axis runs parallel to the piston or cylinder longitudinal axis.

During the charge exchange, the pressure along the flow path in the intake duct varies. Such local pressure fluctuations propagate as waves in gaseous media. To make it possible to utilize these dynamic wave processes for the optimization of the charge exchange, it is for example possible for the inlet region to be designed such that, toward the end of the intake stroke, a positive pressure wave arrives at the inlet openings, which positive pressure wave leads to a compression and therefore to a certain follow-up charging effect. Intake lines of variable length are expedient here.

A multiplicity of additional lines, for example the recirculation line of an exhaust-gas recirculation system or the bypass line of a charge-air cooler or of a compressor, may open into the intake line or overall intake line.

Furthermore, internal combustion engines may be equipped with a heating device which is arranged in the inlet region, that is to say intake region, and which serves for heating the intake air.

The heating of the intake air may serve various purposes, for example to shorten the warm-up phase after a cold start, as described in DE 198 54 077 A1.

The German laid-open specification DE 10 2006 030 464 A1 utilizes the heating of the intake air in large-volume diesel engines also outside the starting and warm-up phase in order to avoid misfires at idle when using fuels with a low cetane number. Furthermore, the heating element is activated during the regeneration of the particle filter, and also when the engine torque and the engine speed fall below a predefined minimum value.

A heating device suitable for use in internal combustion engines is described for example in the German laid-open specification DE 102 14 166 A1 and in the European patent EP 0 793 399 B1.

Said heating devices known from the previous systems comprise strip-like heating elements which are electrically heatable and which have a rectangular cross-sectional outline. The strip-like heating elements are arranged in the inlet region in such a way that their rectangular cross section poses the least possible resistance to the intake combustion air. A first narrow side of the cross section of the strip-like heating elements faces toward the intake combustion air flow, whereas the long sides of the rectangular cross section extend in the flow direction, such that the intake combustion air flows tangentially over the larger longitudinal sides. Such an alignment of the cross section is expedient from a flow aspect but also advantageous with regard to the heat transfer by convection.

The arrangement of the heating device in the intake region of an internal combustion engine is specified in DE 198 54 077 A1 only so far as to state that the heating device may basically also be arranged downstream of a charge-air cooler provided in the intake region. The above-cited approach also discusses the construction of the heating device itself, in particular the flange which serves as a receptacle or frame, and the design of the strip-like heating elements and the materials or material mixtures used for these.

However, the inventors herein have recognized that an intake heater may be configured to optimize air flow into the cylinders in addition to heat the charge air. Thus, embodiments for an internal combustion engine are provided. One example internal combustion engine having at least one cylinder head and at least two cylinders, in which each cylinder has at least one inlet opening for the supply of combustion air into the cylinder, comprises an intake line leading to each inlet opening, an overall intake line where the intake lines of at least two cylinders merge, such that a distributor junction point is formed, and a heating device arranged in the overall intake line which has at least one strip-like heating element, a first narrow side of a cross section of which faces toward intake combustion air flow, wherein the heating device is arranged adjacent to the distributor junction point at which the intake lines merge to form the overall intake line, a spacing between the heating device and the distributor junction point being smaller than the diameter of a cylinder.

In the internal combustion engine according to the disclosure, the heating device is arranged as close as possible to the inlet openings of the cylinders, specifically adjacent to the distributor junction point of an inlet manifold at which the individual intake lines branch off to the at least two cylinders. This arrangement assists the heating device in performing its actual function, specifically that of providing, that is to say supplying, preheated combustion air to the cylinders.

As a result of the arrangement of the heating device close to the distributor junction point, the path of the preheated combustion air to the cylinders is shortened to the greatest possible extent. The preheated combustion air is therefore given as little distance and time as possible to cool down. The thermal inertia of the part of the intake lines between the inlet opening at the cylinder and the heating device is minimized, specifically as a result of the reduction of the mass and the length of said part.

Said measure ensures that the combustion air is at as high a temperature as possible when it enters the cylinders, as a result of which in particular the warm-up phase after a cold start of the internal combustion engine is considerably shortened. This offers advantages in particular with regard to pollutant emissions.

It may be taken into consideration in this context that fast heating of the internal combustion by means of preheated intake air leads to faster, in this case indirect heating of the engine oil. The associated decrease in viscosity results in a reduction in friction and friction losses, in particular in the bearings which are supplied with oil. This effect has an advantageous influence on the fuel consumption.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
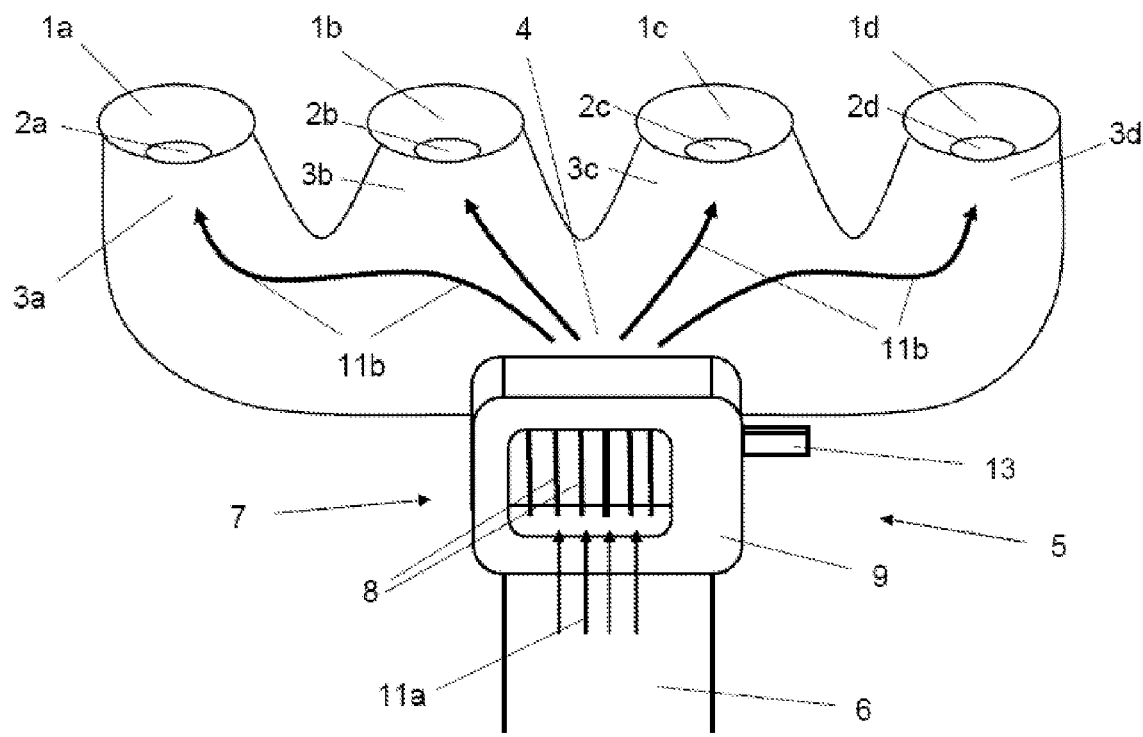
FIG. 1 schematically shows a first embodiment of the inlet region of an internal combustion engine in an oblique plan view.

Intake systems may be equipped with electric heaters in order to rapidly heat the intake combustion air, following a cold engine start, for example. The heating of the intake air helps to decrease engine warm-up times, improving fuel economy and emissions. However, these intake heaters are frequently shut off after the engine has reached a sufficiently warm temperature. During certain operating conditions where the engine may start to cool down, such as during a deceleration fuel shut off (DFSO) operation, otherwise referred to as overrun operation, the heater may be operated to maintain the engine at a desired temperature. Further, the heater may include a plurality of heating elements which may be configured to optimize the distribution of intake air to a plurality of cylinders and serve as a mixing device for mixing intake air and EGR, for example.

Examples of the internal combustion engine are advantageous in which the intake lines of at least two cylinders merge to form an overall intake line within the at least one cylinder head, such that an inlet manifold is formed. The integration of the inlet manifold into the cylinder head further shortens the length, which is relevant in the present case, of the intake lines and therefore the thermal inertia of the part of the intake lines between the cylinder inlet and the heating device. Said measure furthermore permits dense packaging of the drive unit, and reduces the number of components and therefore the assembly and procurement costs.

Nevertheless, examples of the internal combustion engine may be advantageous in which the intake lines of at least two cylinders merge to form an overall intake line outside the at least one cylinder head, and form an external inlet manifold.

The arrangement according to the disclosure of the heating device close to the distributor junction point achieves the first object on which the disclosure is based, specifically that of providing an internal combustion engine which is optimized with regard to the arrangement of the heating device in the intake region.

In contrast to concepts known from the disclosure, the arrangement according to the disclosure of the heating device close to the cylinders makes it possible for the strip-like heating elements to be aligned and/or designed so as to assist a uniform distribution of the intake combustion air to the individual cylinders. Here, the heating device also serves as a guide device for the combustion air.

Examples of the internal combustion engine are advantageous in which the first narrow side of the cross section of the at least one strip-like heating element is substantially perpendicular to the intake combustion air flow.

An internal combustion engine according to the disclosure may also have two cylinder heads, for example if a plurality of cylinders are arranged distributed on two cylinder banks.

According to the disclosure, it is not necessary for the intake lines of all the cylinders of a cylinder head to merge to form an overall intake line, but rather only the intake lines of at least two cylinders.

Examples are however also advantageous in which the intake lines of all the cylinders of the at least one cylinder head merge to form an overall intake line.

The intake lines may also merge to form two overall intake lines, such that two distributor junction points are formed, if more than two cylinders and/or more than one inlet opening are provided per cylinder. If appropriate, two heating devices should then be provided.

Examples of the internal combustion engine are advantageous in which the spacing A between the heating device and the distributor junction point is smaller than one half of the diameter d of a cylinder, $\Delta<0.5d$.

Examples of the internal combustion engine are particularly advantageous in which the spacing $\Delta$ between the heating device and the distributor junction point is smaller than one quarter of the diameter d of a cylinder, $\Delta<0.25d$.

The additional shortening of the spacing $\Delta$ between the heating device and the distributor junction point according to the two abovementioned examples assists in further shortening the path to the cylinders for the preheated combustion air, that is to say in reducing the thermal inertia of the part of the intake lines between the cylinder inlet and the heating device.

Within the context of the present disclosure, the spacing $\Delta$ between the heating device and the distributor junction point refers to the distance between the outlet from the heating device and the center of the distributor junction point, at which the central filaments of flow of the intake lines meet.

In internal combustion engines in which the at least two cylinders are arranged in series along the longitudinal axis of the at least one cylinder head, examples are advantageous wherein the at least one strip-like heating element is aligned substantially horizontally along a line parallel to the longitudinal axis, preferably parallel to the longitudinal axis of the at least one cylinder head.

Tests have shown that a horizontal alignment of the heating elements is advantageous with regard to the distribution of the intake combustion air to the individual cylinders, and also offers advantages with regard to volumetric efficiency.

In internal combustion engines of the type in question, in which the at least two cylinders are arranged in series along the longitudinal axis of the at least one cylinder head, examples are particularly advantageous wherein the at least one strip-like heating element is aligned substantially vertically, perpendicular and preferably at right angles to a line parallel to the longitudinal axis of the at least one cylinder head.

Such an alignment of the strip-like heating elements is particularly suitable for designing or utilizing the heating elements as a guide device for the heated air flow. With such a guide device, the intake combustion air can be conducted and diverted in an advantageous manner so as to provide a uniform distribution of the air to the individual cylinders. It is sought to obtain uniform charging of the cylinders with fresh mixture. This improves the operating behavior of the internal combustion engine, in particular with regard to pollutant emissions, fuel consumption and the available power.

Examples of the internal combustion engine are advantageous in which the at least one strip-like heating element tapers toward a first narrow end side which faces toward the intake combustion air flow.

This yields advantages from a flow aspect. By virtue of the fact that the heating elements taper counter to the flow direction, less turbulence is generated when the air flow impinges on the heating device. Furthermore, the flow cross section of the overall intake line narrows not in an step-like manner but rather continuously, as a result of which the constriction of the component air flows does not take place abruptly. Here, the heating elements cut into the incident flow of air in the manner of a knife. The resistance posed to the air flow by the heating device is reduced by means of the described design of the at least one strip-like heating element, as a result of which the pressure loss generated across the heating device is also reduced. With the embodiment in question, an impairment of the volumetric efficiency as a result of the heating device is counteracted.

Also advantageous for the reasons stated above are examples of the internal combustion engine in which a first narrow end side, which faces toward the intake combustion air flow, of the at least one strip-like heating element tapers.

In this connection, it may also be taken into consideration that modern internal combustion engines are increasingly equipped with an exhaust-gas recirculation system, by means of which exhaust gas is recirculated into the intake region. The exhaust gas to be recirculated is often cooled before being introduced into the intake region. This may be a problem with regard to the heating device if the exhaust gas is introduced into the intake region upstream of the heating device.

Under some circumstances, during cooling, so much heat is extracted from the exhaust-gas mass flow that some exhaust-gas constituents condense out of the hot exhaust gas and are deposited in the heating device. The exhaust-gas constituents that are condensed out may build up an adhesive layer, which grows with progressive operating duration, on the surface of the heating elements, wherein the solid constituents of the exhaust-gas mass flow, in particular soot particles in the exhaust gas, ultimately also become stuck on said layer when they come into contact therewith. The deposits lead to a constricted flow cross section and possibly to a complete closure of the overall intake line, and impair the heat transfer from the heating element to the intake air. A constriction of the flow cross section of the intake duct would furthermore be associated with a pressure loss in the intake flow and an impairment of volumetric efficiency.

A tapering first narrow end side of the at least one strip-like heating element counteracts such deposits. Cross-sectional constrictions as a result of deposits, or even duct blockages caused by condensed-out exhaust-gas constituents, do not pose a risk and are counteracted.

Examples of the internal combustion engine are advantageous in which the cross section of the at least one strip-like heating element is of arc-shaped design, such that the at least one strip-like heating element has a blade-like form.

An arc-shaped design of the strip-like heating element is advantageous with regard to use of the heating device as a guide device. Here, it may be taken into consideration that the distributor junction point is generally arranged centrally in relation to the at least two cylinders, the spatial extent of the junction point is limited, and the preheated air may therefore be diverted to a greater or lesser extent on the path to the cylinders in virtually any embodiment of the internal combustion engine.

The blade-like form of the at least one strip-like heating element permits a diversion of the intake combustion air without losses or with low pressure losses, and a uniform distribution of the air to the individual cylinders.

Examples of the internal combustion engine are advantageous in which the heating device has at least two strip-like heating elements. The heat transfer area, and therefore the amount of heat that can be transferred to the intake combustion air, also increase with the number of heating elements. The number of heating elements is of not inconsiderable significance with regard to the transfer of heat, because the flow speeds in the overall intake line are high, and the temperature of the heating elements and therefore the temperature difference between the heating elements and the air cannot be increased arbitrarily in order to increase the heat transfer.

The design of the heating device as a guide device is likewise facilitated if a plurality of heating elements is provided and these can be used for influencing the flow.

Here, examples of the internal combustion engine are advantageous in which the at least two strip-like heating elements are arranged spaced apart from one another. Only in this way is it possible to utilize the advantages offered by multiple heating elements.

In internal combustion engines with at least two strip-like heating elements which are aligned substantially vertically, perpendicular to a line parallel to the longitudinal axis of the at least one cylinder head, examples have proven to be advantageous wherein at least two strip-like heating elements are set at an acute angle with respect to one another. Such an arrangement of the heating elements serves to fan out the preheated air flow, as a result of which said air flow is distributed to the cylinders.

In the above-stated type of internal combustion engine, in which the at least two strip-like heating elements are aligned substantially vertically, examples are furthermore advantageous in which at least two strip-like heating elements have a blade-like form, wherein the concave side faces outward.

In this connection, facing outward means that the concave, that is to say inwardly arched side of the wall faces toward the overall intake line or toward the flange, which holds the heating elements, of the heating device, and faces away from the central filament of flow of the combustion air flow. Here, the at least two heating elements open preferably in a funnel-like manner.

Examples of the internal combustion engine are advantageous in which the at least one heating element is held by a flange. Said embodiment makes it possible for the heating device to be provided as a preassembled structural unit and for heating devices of identical type to be used in different internal combustion engines. This increases the quantities produced, and thereby lowers the unit costs. Furthermore, it is made easier to exchange a defective heating device.

Examples of the internal combustion engine are however also advantageous in which the overall intake line holds the at least one heating element, that is to say replaces the flange as a holder.

Examples of the internal combustion engine are advantageous in which a charge-air cooler is provided which is equipped with a bypass line which opens into the overall intake line upstream of the heating device.

The charge-air cooler lowers the air temperature and thereby increases the density of the air, as a result of which the cooler also contributes to improved charging of the cylinders with air, that is to say to a greater air mass. The provision of a bypass line for the charge-air cooler for the purpose of bypassing the cooler has proven to be advantageous in particular after a cold start of the internal combustion engine or during the warm-up phase. Cooling of the intake air in these operating states would counteract, that is to say oppose, the heating in the heating device.

Examples of the internal combustion engine are advantageous in which an external exhaust-gas recirculation system is provided which is equipped with a recirculation line which opens into the overall intake line upstream of the heating device.

The recirculation of combustion gases from the exhaust-gas side into the intake region is considered to be expedient for adhering to future limit values for nitrogen oxide emissions, wherein high exhaust-gas recirculation rates which may be of the order of magnitude of $x_{EGR} \approx 60\%$ to 70% are required in order to obtain a considerable reduction in nitrogen oxide emissions.

Here, the recirculation rate $x_{EGR}$ is determined as $x_{EGR} = m_{EGR}/(m_{EGR} + m_{fresh\ air})$, where $m_{EGR}$ denotes the mass of recirculated exhaust gas and $m_{fresh\ air}$ denotes the supplied fresh air.

A cooling device is often provided in the exhaust-gas recirculation line, by means of which cooling device the temperature in the hot exhaust-gas flow is reduced, as a result of which the density of the exhaust gases is increased. The combustion air temperature which results upon the mixing of the fresh air with the recirculated exhaust gases is likewise reduced in this way, as a result of which the cooling device of the exhaust-gas recirculation system also contributes to improved charging of the cylinders. A liquid-cooling arrangement is generally used. If appropriate, it may be advantageous for said cooling device to be equipped—like the charge-air cooler—with a bypass line.

Gas flows introduced into the overall intake line generate turbulence. If the bypass line of a charge-air cooler and/or the recirculation line of an exhaust-gas recirculation system opens into the overall intake line upstream of the heating device, the heating device arranged downstream also serves to calm the combustion air flow.

Examples of the internal combustion engine are advantageous in which a supercharging arrangement is provided. Supercharging serves primarily to increase the power of the internal combustion engine. Supercharging is however also a suitable means for reducing the swept volume for an unchanged level of power, as a result of which—for given vehicle boundary conditions—the load collective can be shifted toward higher loads, where the specific fuel consumption is lower.

The second sub-object on which the disclosure is based, specifically that of specifying a method for operating an internal combustion engine of an above-described type, is achieved by means of a method wherein the heating device is activated so as to heat the combustion air when the fuel supply of the internal combustion engine is deactivated.

If the fuel supply is deactivated, the release of heat during the combustion as a result of the exothermic chemical conversion of the fuel, which heat serves to keep the internal combustion engine at operating temperature, is eliminated. It is therefore advantageous for the heating device to be activated so as to heat the combustion air when the fuel supply of the internal combustion engine is deactivated.

Here, examples of the method are advantageous in which the heating device is activated so as to heat the combustion air when the fuel supply of the internal combustion engine is deactivated for a predefinable time period $\Delta t_1$. The introduction of an additional condition for the activation of the heating device is intended to prevent excessively frequent activation and deactivation of the heating device, in particular an activation of the heating device if the fuel supply is deactivated only briefly, without the need for heating of the intake air by means of the heating device.

Referring now to FIG. 1, it schematically shows a first embodiment of the inlet region 5 of an internal combustion engine in an oblique plan view. The internal combustion engine comprises four cylinders 1a, 1b, 1c, 1d in an in-line arrangement along the longitudinal axis of the cylinder head.

The cylinders 1a, 1b, 1c, 1d of the internal combustion engine are supplied with fresh air or combustion air 11a via the overall intake line 6. A heating device 7 for heating the combustion air 11a is arranged in the overall intake line 6.

Downstream of the heating device 7, the overall intake line 6 merges into a plurality of intake lines 3a, 3b, 3c, 3d such that a distributor junction point 4 is formed, which intake lines lead to the inlet openings 2a, 2b, 2c, 2d of the individual cylinders 1a, 1b, 1c, 1d.

The heating device 7 has a multiplicity of strip-like heating elements 8 which are aligned, that is to say run, substantially vertically with respect to a line parallel to the longitudinal axis of the cylinder head, and a first narrow side of the cross section of said strip-like heating elements faces toward the intake combustion air flow 11a. The heating elements 8 are held by a flange 9 and can be electrically heated. An electrical terminal 13 is provided.

The combustion air 11a sucked in via the overall intake line 6 is heated as it flows through the activated heating device 7. Subsequently, that is to say downstream of the heating device 7, the heated combustion air 11b is distributed, at the distributor junction point 4, to the individual cylinders 1a, 1b, 1c, 1d.

The embodiment of an inlet region 5 illustrated in FIG. 1 is characterized by the fact that the heating device 7 is arranged adjacent to the distributor junction point 4, wherein the spacing Δ between the heating device 7 and the distributor junction point 4 is smaller than the diameter d of a cylinder 1a, 1b, 1c, 1d.

Figures 2A, 2B, 2C, 2D:
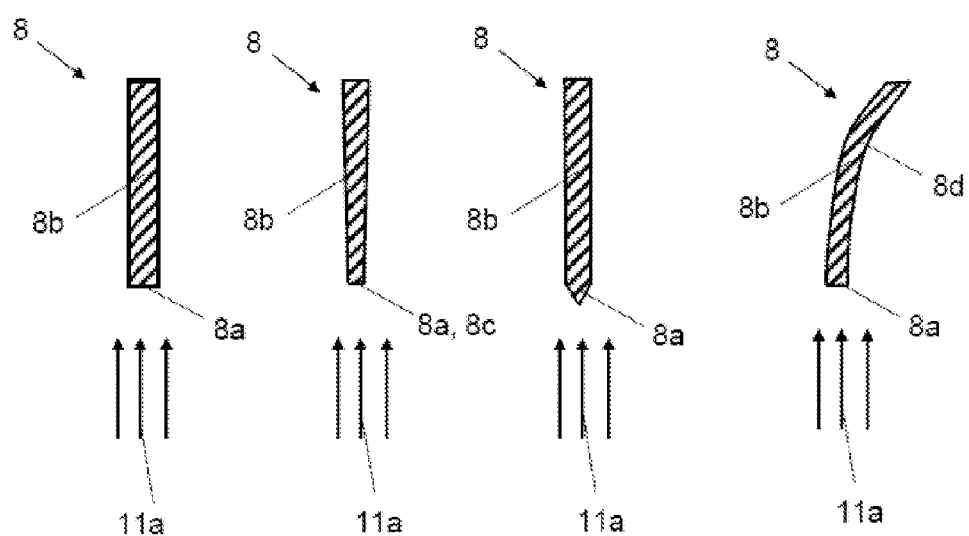
FIG. 2a schematically shows a first embodiment of a strip-like heating element in cross section.
FIG. 2b schematically shows a second embodiment of a strip-like heating element in cross section.
FIG. 2c schematically shows a third embodiment of a strip-like heating element in cross section.
FIG. 2d schematically shows a fourth embodiment of a strip-like heating element in cross section.

FIG. 2a schematically shows a first embodiment of the strip-like heating element 8 in cross section. The heating element 8 has a cross section 8b of rectangular outline, and a first narrow side 8a of the cross section 8b of said heating element faces toward the intake combustion air flow 11a.

FIG. 2b schematically shows a second embodiment of the strip-like heating element 8 in cross section. It is sought to explain only the differences in relation to the embodiment illustrated in FIG. 2a, for which reason reference is otherwise made to FIG. 2a. The same reference symbols have been used for the same components.

In contrast to the embodiment illustrated in FIG. 2a, the cross section 8b tapers in the direction of the first narrow side 8a, and therefore the strip-like heating element 8 tapers toward a first narrow end side 8c which faces toward the intake combustion air flow 11a.

FIG. 2c schematically shows a third embodiment of the strip-like heating element 8 in cross section. It is sought to explain only the differences in relation to the embodiment illustrated in FIG. 2a, for which reason reference is otherwise made to FIG. 2a. The same reference symbols have been used for the same components.

In contrast to the embodiment illustrated in FIG. 2a, the first narrow side 8a of the cross section 8b, and therefore the first narrow end side 8c of the heating element 8, tapers toward the intake combustion air flow 11a, that is to say counter to the flow direction.

FIG. 2d schematically shows a fourth embodiment of the strip-like heating element 8 in cross section. It is sought to explain only the differences in relation to the embodiment illustrated in FIG. 2a, for which reason reference is otherwise made to FIG. 2a. The same reference symbols have been used for the same components.

In contrast to the embodiment illustrated in FIG. 2a, the strip-like heating element 8 has a blade-like form with a concave side 8d and a convex side.

Thus, the engine system described above with respect to FIGS. 1 and 2a-2d provides for an engine system, comprising an intake manifold coupled to a plurality of cylinders, and a heating device arranged in the intake manifold, the heating device including a plurality of heating elements configured to evenly distribute intake air to the plurality of cylinders. The system may include wherein the plurality of heating elements are arranged vertically, and wherein at least two of the plurality of heating elements are arranged at an acute angle with respect to each other. The system may also include wherein each of the plurality of heating elements tapers in width opposite to a flow direction of the intake air.

Figure 3:
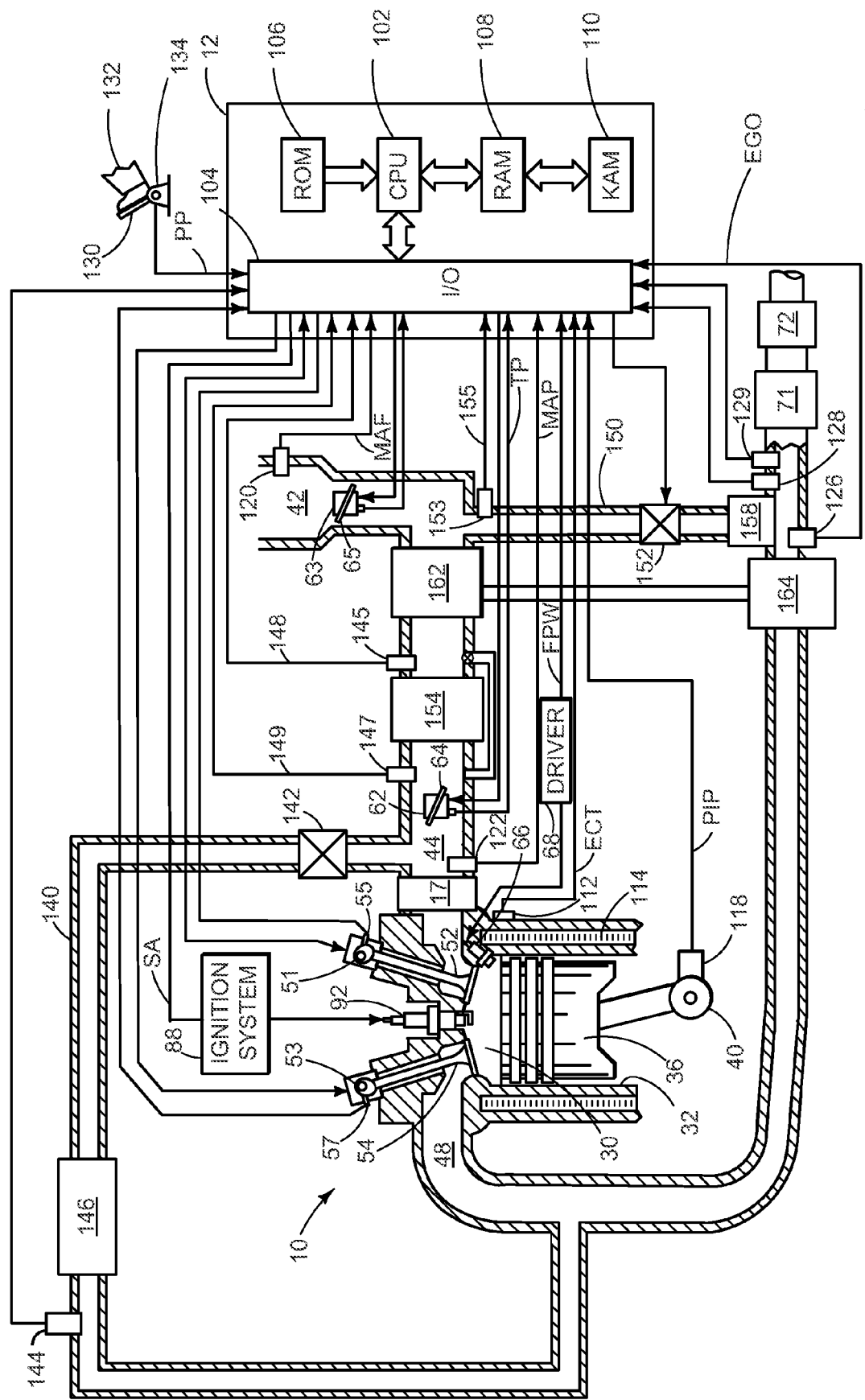
FIG. 3 schematically shows an embodiment of a single cylinder of a multi-cylinder engine.

Referring now to FIG. 3, it shows a schematic diagram of one cylinder of multi-cylinder engine 10, which may be included in a propulsion system of an automobile.

Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 (cylinder 30 is one non-limiting example of cylinders 1a-d of FIG. 1) of engine 10 may include combustion chamber walls 32 with piston 36 positioned therein. In some examples, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some examples, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Combustion in engine 10 can be of various types, depending on operating conditions. While FIG. 1 depicts a spark ignition engine, it will be appreciated that the embodiments described herein may be used in any suitable engine, including but not limited to, diesel and gasoline compression ignition engines, spark ignition engines, direct or port injection engines, etc. Further, various fuels and/or fuel mixtures such as diesel, bio-diesel, etc, may be used.

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Pressure, temperature, and mass air flow may be measured at various points along intake passage 42 and intake manifold 44. For example, intake passage 42 may include a mass air flow sensor 120 for measuring clean air mass flow entering through throttle 63. The clean air mass flow may be communicated to controller 12 via the MAF signal.

Engine 10 may further include a compression device such as a turbocharger or supercharger including at least a compressor 162 arranged upstream of intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. Various turbocharger arrangements may be used. For example, a variable nozzle turbocharger (VNT) may be used when a variable area nozzle is placed upstream and/or downstream of the turbine in the exhaust line for varying the effective expansion of gasses through the turbine. Still other approaches may be used for varying expansion in the exhaust, such as a waste gate valve.

An intake air heating device 17 is shown arranged in intake manifold 44. Air intake heating device 17 is one example of intake air heater 7 described above with respect to FIG. 1. Similar to the embodiments described above, intake air heating device 17 may be an electric heater configured to heat the intake air prior to reaching cylinder 30. Additional detail regarding control routines for operating the intake air heating device will be described in more detail below with respect to FIG. 4.

A charge air cooler 154 may be included downstream from compressor 162 and upstream of intake air heating device 17 and intake valve 52. Charge air cooler 154 may be configured to cool gases that have been heated by compression via compressor 162, for example. In one embodiment, charge air cooler 154 may be upstream of throttle 62. Pressure, temperature, and mass air flow may be measured downstream of compressor 162, such as with sensor 145 or 147. The measured results may be communicated to controller 12 from sensors 145 and 147 via signals 148 and 149, respectively. Pressure and temperature may be measured upstream of compressor 162, such as with sensor 153, and communicated to controller 12 via signal 155. Further, charge air cooler 154 is depicted has including a bypass line, wherein the compressed air may bypass the charge air cooler 154, for example when intake air heating is desired.

Further, in the disclosed embodiments, an EGR system may route a desired portion of exhaust gas from exhaust passage 48 to intake manifold 44. FIG. 3 shows an HP-EGR system and an LP-EGR system, but an alternative embodiment may include only an LP-EGR system or only an HP-EGR system. Further, in another embodiment of the present disclosure, the engine may not include a turbocharger, and as such a single (non-HP or LP) EGR system may be present. The HP-EGR is routed through HP-EGR passage 140 from upstream of turbine 164 to downstream of compressor 162. The amount of HP-EGR provided to intake manifold 44 may be varied by controller 12 via HP-EGR valve 142. The LP-EGR is routed through LP-EGR passage 150 from downstream of turbine 164 to upstream of compressor 162. The amount of LP-EGR provided to intake manifold 44 may be varied by controller 12 via LP-EGR valve 152. The HP-EGR system may include HP-EGR cooler 146 and the LP-EGR system may include LP-EGR cooler 158 to reject heat from the EGR gases to engine coolant, for example. Similar to charge air cooler 154, HP-EGR cooler 146 may also include a bypass line.

Under some conditions, the EGR system may be used to regulate the temperature of the air and fuel mixture within combustion chamber 30. Thus, it may be desirable to measure or estimate the EGR mass flow. EGR sensors may be arranged within EGR passages and may provide an indication of one or more of mass flow, pressure, temperature, concentration of O2, and concentration of the exhaust gas. For example, an HP-EGR sensor 144 may be arranged within HP-EGR passage 140.

In some embodiments, one or more sensors may be positioned within LP-EGR passage 150 to provide an indication of one or more of a pressure, temperature, and air-fuel ratio of exhaust gas recirculated through the LP-EGR passage. Exhaust gas diverted through LP-EGR passage 150 may be diluted with fresh intake air at a mixing point located at the junction of LP-EGR passage 150 and intake passage 42. Specifically, by adjusting LP-EGR valve 152 in coordination with first air intake throttle 63 (positioned in the air intake passage of the engine intake, upstream of the compressor), a dilution of the EGR flow may be adjusted.

A percent dilution of the LP-EGR flow may be inferred from the output of a sensor 145 in the engine intake gas stream. Specifically, sensor 145 may be positioned downstream of first intake throttle 63, downstream of LP-EGR valve 152, and upstream of second main intake throttle 62, such that the LP-EGR dilution at or close to the main intake throttle may be accurately determined. Sensor 145 may be, for example, an oxygen sensor such as a UEGO sensor.

Exhaust gas sensor 126 is shown coupled to exhaust passage 48 downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), HC, or CO sensor. Further, exhaust passage 48 may include additional sensors, including a NOx sensor 128 and a particulate matter (PM) sensor 129, which indicates PM mass and/or concentration in the exhaust gas. In one example, the PM sensor may operate by accumulating soot particles over time and providing an indication of the degree of accumulation as a measure of exhaust soot levels.

Emission control devices 71 and 72 are shown arranged along exhaust passage 48 downstream of exhaust gas sensor 126. Devices 71 and 72 may be a selective catalytic reduction (SCR) system, three way catalyst (TWC), NOx trap, various other emission control devices, or combinations thereof. For example, device 71 may be a TWC and device 72 may be a particulate filter (PF). In some embodiments, PF 72 may be located downstream of TWC 71 (as shown in FIG. 1), while in other embodiments, PF 72 may be positioned upstream of TWC 72 (not shown in FIG. 1).

Controller 12 is shown in FIG. 3 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 3 shows only one cylinder of a multi-cylinder engine, and that each cylinder may similarly include its own set of intake/exhaust valves, fuel injector, etc.

Figure 4:
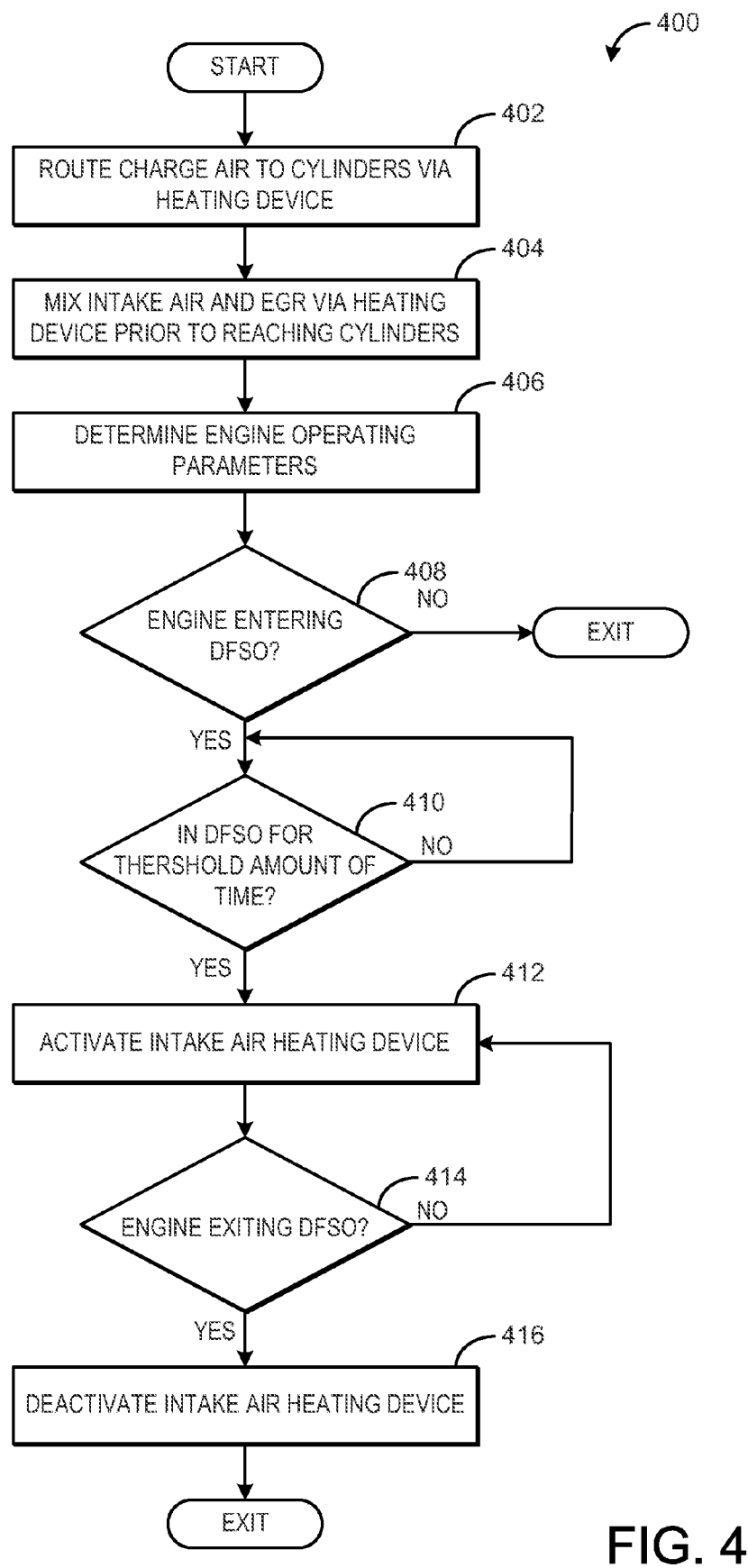
FIG. 4 is a flow chart illustrating a method for operating an intake air heating device according to an embodiment of the present disclosure.
Figure 5:
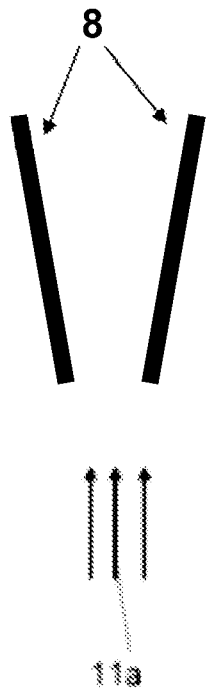
FIG. 5 schematically shows an embodiment of strip-like heating elements in cross section at an acute angle that represented only schematically.

FIG. 4 is a flow chart illustrating a method 400 for controlling operation of an intake air heating device, such as heating device 7 OR 17. Method 400 may be carried out by an engine controller, such as controller 12, according to instructions stored in the memory thereof.

At 402, method 400 includes routing charge air to a plurality of cylinders of the engine via the intake air heating device arranged in the intake manifold. At 404, depending on engine operating conditions, intake air and EGR may be mixed by the intake heating device prior to reaching the cylinders. For example, during certain operating conditions such as high engine speed and load, EGR may be activated in order to lower combustion temperatures and control NOx emissions. If EGR is flowing, the intake air heating device, due to the configuration of the heating elements in the heating device, may act to mix the EGR with the intake air, thus ensuring an even distribution of EGR and intake air to each of the plurality of cylinders.

At 406, method 400 includes determining engine operating parameters. Engine operating parameters may be determined based on feedback from various engine sensors, and may include engine speed, load, air/fuel ratio, temperature, etc. Further, engine operating parameters may be determined over a given duration, e.g., 10 seconds, in order to determine whether certain engine operating conditions are changing, or whether the engine is operating under steady-state conditions. Method 400 includes, at 408, determining if the engine is entering into deceleration fuel shut-off (DFSO). During DFSO, the engine is operated without fuel injection while the engine rotates and pumps air through the cylinders. DFSO entry may be based on various vehicle and engine operating conditions. In particular, a combination of one or more of vehicle speed, vehicle acceleration, engine speed, engine load, throttle position, pedal position, transmission gear position, and various other parameters may be used to determine whether the engine will be entering DFSO. In one example, the DFSO entry conditions may be based on an engine speed below a threshold. In another example, the DFSO entry conditions may be based on an engine load below a threshold. In still another example, the DFSO condition may be based on an accelerator pedal position. Additionally or alternatively, entry into DFSO may be determined based on a commanded signal to cease fuel injection.

If the engine is entering into DFSO, method 400 proceeds to 410 to determine if the engine has been operating with DFSO for a threshold period of time. If no, method 400 returns to continue monitoring the threshold time period. If yes, method 400 proceeds to 412 to activate the intake air heating device to heat the intake air prior to reaching the cylinders. At 414, it is determined if the engine is exiting DFSO. Exit out of DFSO may be indicated by a command to resume fuel injection. In another example, exit out of DFSO may be determined by a change in accelerator pedal position. If the engine is not exiting out of DFSO, method 400 returns to 412 to continue to activate the heating device. If the engine is exiting out of DFSO, method 400 proceeds to 416 to deactivate the heating device. Upon deactivating the intake heating device, method 400 returns.

While method 400 of FIG. 4 shows the intake air heating device being activated and deactivated based on operation in and out of DFSO, respectively, in some embodiments, the intake air heating device may activated or deactivated based on additional operating conditions. For example, a temperature sensor in the exhaust passage may output the temperature of the exhaust, and if it falls below a threshold, then the intake heater may be activated. Further, the intake heater may be continued to be operated until after the engine exits out of DFSO, for example for a predetermined number of engine cycles or until the exhaust temperature reaches a threshold.

Thus, method 400 of FIG. 4 provides for an engine method comprising directing intake air and EGR to a combustion cylinder via an intake manifold, and prior to reaching the combustion chamber, mixing the intake air and EGR via an intake air heating device arranged in the intake manifold. In some embodiments, the intake air may be compressed via a turbocharger compressor prior to reaching the heating device.

It will be appreciated that the configurations and methods disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
directing intake air and EGR to a combustion cylinder via an intake manifold; and
prior to reaching a combustion chamber, mixing the intake air and EGR via an intake air heating device arranged in the intake manifold via an at least one strip-like heating element with a tapered end facing intake combustion air flow.

2. The engine method of claim 1, wherein the intake air is compressed via a turbocharger compressor prior to reaching the intake manifold.

3. The engine method of claim 1, further comprising mixing the intake air and EGR via the at least one strip-like heating element with the tapered end facing intake combustion air flow.

4. The engine method of claim 1, further comprising mixing the intake air and EGR via an at least one strip-like heating element of an arc-shaped design.

5. The engine method of claim 1, further comprising mixing the intake air and EGR via at least two strip-like elements spaced apart from one another.

6. The engine method of claim 1, wherein the directing of the intake air and EGR further includes directing the intake air and EGR to be mixed via at least two strip-like heating elements aligned substantially vertically, perpendicular to a line parallel to a longitudinal axis of at least one cylinder head.

7. The engine method of claim 1, further comprising directing the intake air from a charge-air cooler which is equipped with a bypass line which opens into the intake manifold upstream of the heating device, directing the intake air to the combustion chamber.

8. The engine method of claim 1, wherein the directing further includes directing EGR from an external exhaust-gas recirculation system into the intake manifold via a recirculation line, wherein EGR is further directed from the recirculation line into the intake manifold via an opening upstream of the heating device.

9. An engine method, comprising:
directing intake air and EGR to a combustion cylinder via an intake manifold;
prior to reaching a combustion chamber, mixing the intake air and EGR via an intake air heating device arranged in the intake manifold; and
activating the heating device so as to heat combustion air when a fuel supply of an internal combustion engine is deactivated.

10. The engine method of claim 1, further comprising directing the intake air and EGR to the combustion chamber via an intake line leading to an inlet opening of the combustion chamber.

11. The engine method of claim 10, further comprising mixing the intake air heating device and EGR via the heating device comprising the at least one strip-like heating element, a first narrow side of a cross section of which faces toward intake combustion air flow.

12. The method of claim 11, wherein the directing of the intake air and EGR further comprises directing the intake air and EGR through the intake manifold where intake lines of at least two cylinders merge, such that a distributor junction point is formed.

13. The method of claim 12, further comprising mixing the intake air and EGR at a location adjacent to the distributor junction point in the intake manifold, via the intake air heating device arranged adjacent to the distributor junction point at which the intake lines merge to form the intake manifold.

14. The method of claim 13, further comprising mixing the intake air and EGR via the intake air heating device, wherein the intake air heating device is spaced at a distance from the distributor junction point of less than a diameter of a cylinder.

15. The engine method of claim 12, further comprising mixing the intake air and EGR via the intake air heating device including a plurality of heating elements configured to evenly distribute intake air to at least two cylinders.

* * * * *